US010513268B2

(12) United States Patent
Ryne et al.

(10) Patent No.: US 10,513,268 B2
(45) Date of Patent: *Dec. 24, 2019

(54) VEHICLE SAFETY SYSTEM

(71) Applicant: STEERING SOLUTIONS IP HOLDING CORPORATION, Saginaw, MI (US)

(72) Inventors: Zaki Ryne, Rochester Hills, MI (US); Jian Sheng, Madison Heights, MI (US); Tejas M. Varunjikar, Troy, MI (US); Farhad Bolourchi, Novi, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/947,162

(22) Filed: Apr. 6, 2018

(65) Prior Publication Data
US 2018/0290657 A1 Oct. 11, 2018

Related U.S. Application Data

(60) Provisional application No. 62/482,955, filed on Apr. 7, 2017.

(51) Int. Cl.
| | |
|---|---|
| *B60W 30/18* | (2012.01) |
| *B60W 50/14* | (2012.01) |
| *B60W 30/095* | (2012.01) |
| *G06K 9/00* | (2006.01) |

(52) U.S. Cl.
CPC .. *B60W 30/18163* (2013.01); *B60W 30/0956* (2013.01); *B60W 50/14* (2013.01); *G06K 9/00798* (2013.01); *G06K 9/00818* (2013.01); *G06K 9/00825* (2013.01); *B60W 2050/146* (2013.01); *B60W 2420/42* (2013.01); *B60W 2420/52* (2013.01); *B60W 2420/62* (2013.01); *B60W 2550/22* (2013.01); *B60W 2550/302* (2013.01); *B60W 2550/308* (2013.01)

(58) Field of Classification Search
CPC ............ B62D 15/025; B60W 2550/30; B60W 2550/302; B60W 2550/308; B60W 30/095; B60W 30/0956; B60W 50/14; G06K 9/00798
See application file for complete search history.

(56) References Cited

U.S. PATENT DOCUMENTS

| | | | |
|---|---|---|---|
| 8,930,081 B2 | 1/2015 | Bolourchi et al. | |
| 2004/0262063 A1* | 12/2004 | Kaufmann | B62D 1/24 180/169 |
| 2007/0061066 A1 | 3/2007 | Bruelle-Davis | |
| 2008/0172153 A1* | 7/2008 | Ozaki | G06F 7/00 701/36 |

(Continued)

*Primary Examiner* — Mirza F Alam

(57) ABSTRACT

A vehicle safety system includes a controller in communication with at least one of an imaging system and a ranging system. At least one of the imaging system and the ranging system being arranged to monitor a distance and a speed of a forward vehicle and an incoming vehicle relative to a host vehicle. The controller is programmed to output for display a time left to pass the forward vehicle based on the distance and the speed of the forward vehicle and the incoming vehicle, responsive to indicia of an impending host vehicle maneuver to pass the forward vehicle.

18 Claims, 5 Drawing Sheets

(56) References Cited

U.S. PATENT DOCUMENTS

| | | | |
|---|---|---|---|
| 2014/0300743 A1* | 10/2014 | Kumon | H04N 7/183 348/148 |
| 2015/0142207 A1 | 3/2015 | Flehmig et al. | |
| 2018/0286242 A1 | 10/2018 | Talamonti et al. | |

* cited by examiner

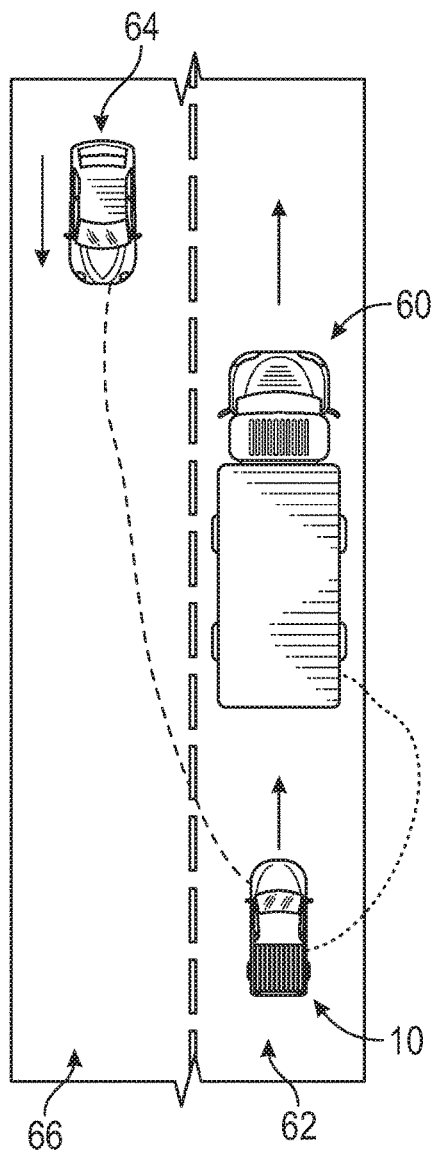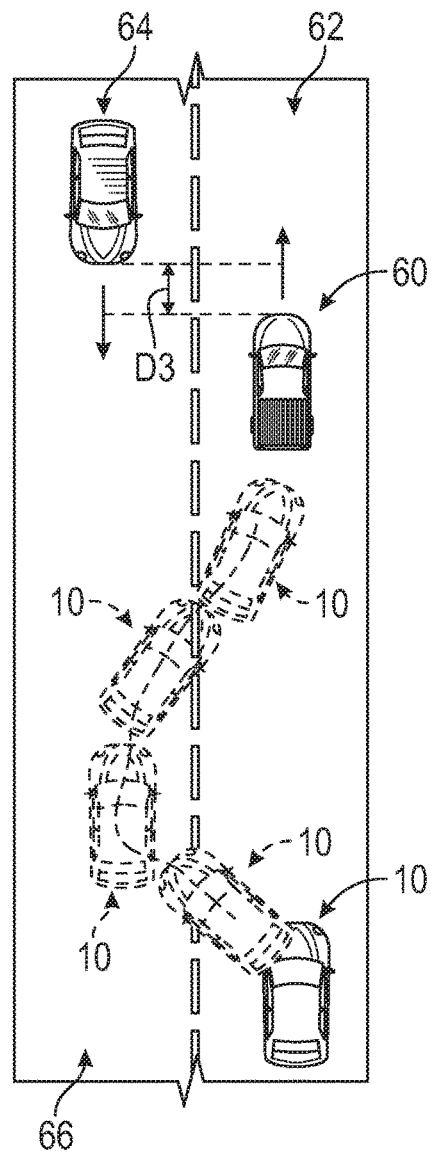
FIG. 5
FIG. 6

VEHICLE SAFETY SYSTEM

CROSS-REFERENCES TO RELATED APPLICATIONS

This patent application claims priority to U.S. Provisional Patent Application Ser. No. 62/482,955, filed Apr. 7, 2017, which is incorporated herein by reference in its entirety.

BACKGROUND

Vehicles may be provided with several technologies that allow the monitoring of conditions about a moving vehicle. The technologies may enable the vehicle to detect the presence of other vehicles and obstacles. The technologies may also alert an operator of the vehicle or perform certain maneuvers in response to other vehicles or obstacles.

SUMMARY

According to an embodiment of the present disclosure, a vehicle safety system is provided. The vehicle safety system includes a controller in communication with at least one of an imaging system and a ranging system. At least one of the imaging system and the ranging system being arranged to monitor a distance and a speed of a forward vehicle and an incoming vehicle relative to a host vehicle. The controller is programmed to output for display a time left to pass the forward vehicle based on the distance and the speed of the forward vehicle and the incoming vehicle, responsive to indicia of an impending host vehicle maneuver to pass the forward vehicle.

According to another embodiment of the present disclosure, a vehicle safety system is provided. The vehicle safety system includes a ranging system and a controller. The ranging system is arranged to provide a signal indicative of at least one of a first speed of a forward vehicle and a second speed of an incoming vehicle, and a first distance between the forward vehicle and a host vehicle and a second distance between the incoming vehicle and the host vehicle. The controller is in communication with the ranging system. The controller is programmed to output for display, a time left to pass the forward vehicle based on the signal.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 5 is an illustration of the host vehicle traveling in a lane and in communication with the vehicle and the incoming vehicle;

FIG. 6 is an illustration of the host vehicle performing a full steering assist back to a lane;

DETAILED DESCRIPTION

Referring now to the Figures, where the invention will be described with reference to specific embodiments, without limiting same, it is to be understood that the disclosed embodiments are merely illustrative of the invention that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
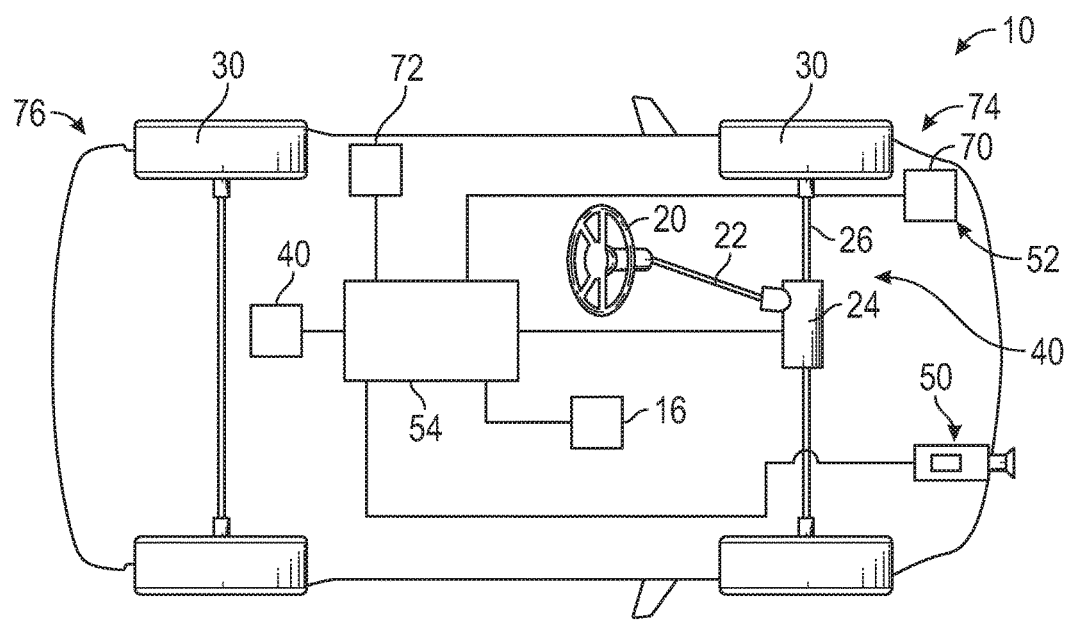
FIG. 1 is a schematic illustration of a host vehicle.

Referring to FIG. 1, a host vehicle 10 is provided with a steering system 12, a vehicle safety system 14, and a display interface 16.

The steering system 12 may be a steering actuation system, such as an electric power steering system, active front steering (AFS), steer by wire (SBW), or hydraulic power steering (HPS). The steering system 12 includes an operator input device 20, a steering shaft 22, a steering actuator 24, and a steering mechanism 26.

The operator input device 20 may be a hand wheel or a steering wheel that is operably connected to the steering shaft 22. The operator input device 20 is arranged to receive an operator input to steer the host vehicle 10.

The steering shaft 22 extends between a steering shaft first end and a steering shaft second end. The steering shaft first end is configured to attach to the operator input device 20. The steering shaft second end is configured to be operatively connected to the steering actuator 24.

The rotation of the steering shaft 22 may result in actuation of the steering actuator 24 to operate the steering mechanism 26 that is operatively connected to a vehicle wheel 30 to pivot or turn the vehicle wheel 30 to steer the host vehicle 10. The steering mechanism 26 may be a rack and pinion steering mechanism or the like.

The steering actuator 24 may be referred to as a "hand wheel actuator." The steering actuator 24 may include and electric motor or an electromechanical actuator that may be operatively connected to the second end of the steering shaft 22 and/or the steering mechanism 26. The steering actuator 24 may replace a direct mechanical connection between the steering shaft 22 and the steering mechanism 26 that is operatively connected to a vehicle wheel, such that the steering system 12 is a steer by wire steering system.

The steering actuator 24 may be configured to interpret a position of the steering shaft 22 and/or the operator input device 20 connected to the steering shaft and to provide that position as a steering input to the steering mechanism 26 that is operatively connected to the vehicle wheel 30 to pivot the vehicle wheel 30. The steering actuator 24 is configured to provide an input to the steering shaft 22 or operator input device 20 to resist or oppose rotation of the operator input device based on inputs received by the vehicle safety system 14.

In at least one embodiment, the host vehicle 10 may be provided with an autonomous driving system (ADS). The ADS 40 operates the host vehicle 10 such that the host vehicle 10 is able to perform operations without continuous input from a driver (e.g. steering, accelerating, braking, maneuvering, turning, etc.), while operating in an autonomous mode. The ADS 40 enables the host vehicle to be at least partially autonomously controlled based on inputs received from the vehicle safety system 14 and/or other vehicle systems such that the host vehicle 10 may be an autonomous vehicle, a semi-autonomous vehicle, an autonomously driven vehicle, or a selectively autonomous vehicle. The other vehicle systems may be a global positioning system, a mapping system, a traffic notification or monitoring system, or the like that may enable the ADS 40 to control or guide the host vehicle 10.

An operator of the host vehicle 10 may desire to overtake and pass a forward vehicle 60 within a current lane or a same lane 62 of traffic/travel as the host vehicle 10 while operating on an undivided highway. An incoming vehicle 64 in an adjacent lane (e.g. a lane adjacent to the same lane 62 for traffic traveling in the same direction as the host vehicle 10) or an adjacent lane 66 or a lane adjacent to the same lane 62 for traffic traveling in the opposite direction of the host vehicle 10 (e.g. opposing lane) may present a hazard that the operator of the host vehicle 10 may be unaware of, therefore, the vehicle safety system 14 is arranged to notify the operator the host vehicle 10 of the potential hazard of the incoming vehicle 64 during an impending maneuver to overtake and pass the forward vehicle 60. The vehicle safety system 14 is also arranged to operate the steering system 12 to return the host vehicle 10 to the same lane 62 and inhibit the overtaking and passing of the forward vehicle 60.

The vehicle safety system 14 includes an imaging system 50, a ranging system 52, and a controller 54. The vehicle safety system 14 is in communication with the steering system 12 and the ADS 40.

The imaging system 50 detects and/or identifies object(s) or other vehicles within the external operating environment of the host vehicle. For example, the imaging system 50 detects and/or identifies the forward vehicle 60 operating within the same lane 62 of travel as the host vehicle 10, an object, and/or the incoming vehicle 64 in the adjacent lane 66.

The imaging system 50 includes a sensor that is in communication with the controller 54 and detects, identifies, and/or determines the state of the object, the forward vehicle 60, or the incoming vehicle 64. For example, a first signal from the sensor that is provided to the controller 54, enables the controller 54 to identify the object, the forward vehicle 60, the incoming vehicle 64, or a traffic control device, such as a stop sign, traffic light, or the like. The sensor of the imaging system 50 may be disposed proximate the front of the host vehicle 10 and may be forward facing. The sensor of the imaging system 50 may be disposed proximate a forward corner of the host vehicle 10. The sensor may be an object sensor, an optical sensor, an optical camera, a thermal sensor, a laser device, LiDAR, RADAR, a combination of the aforementioned, or a vehicle to vehicle communication system.

The sensor of the imaging system 50 provides data or a first signal indicative of an identity, a state, or relative location of the object, the forward vehicle 60, or the incoming vehicle 64. The first signal may for example, include information indicative of whether the object, the forward vehicle 60, or the incoming vehicle 64 is in motion or stationary, the direction of travel of the object, the forward vehicle 60, or the incoming vehicle 64, or whether the object is a stop sign, a yield sign, a green light, a yellow light, or a red light (i.e. related to traffic control or vehicle control).

In at least one embodiment, the sensor of the imaging system 50 is arranged to determine or identify lane markings or the shape or curvature of the same lane 62 and/or the adjacent lane 66. In other embodiments, the controller 54 may be in communication with a GPS system or navigation system that provides information indicative of the shape or curvature of the same lane 62 and/or the adjacent lane 66.

The ranging system 52 detects and/or monitors a distance between the object, the forward vehicle 60, and/or the incoming vehicle 64 and the host vehicle 10. The ranging system 52 detects and/or monitors a speed of the object, the forward vehicle 60, and/or the incoming vehicle 64 or a change in the distance between the object, the forward vehicle 60, and/or the incoming vehicle 64 and the host vehicle 10.

The ranging system 52 includes a first ranging sensor 70 and/or a second ranging sensor 72, both of which are arranged to provide a second signal indicative of at least one of the speed or velocity of the object, the forward vehicle 60, and/or the incoming vehicle 64 and/or the distance between the object, the forward vehicle 60, and/or the incoming vehicle 64 and the host vehicle 10.

Additionally or alternatively, the vehicle to vehicle communication system may be used to identify the forward vehicle 60 and/or the incoming vehicle 64 as well as to monitor or determine a velocity of the forward vehicle 60 and/or the incoming vehicle 64 and/or a distance between the forward vehicle 60 and/or the incoming vehicle 64 and the host vehicle 10.

The first ranging sensor 70 may be disposed proximate a front corner 74 of the host vehicle 10. The second ranging sensor 72 may be disposed proximate a rear corner 76 of the host vehicle 10. In at least one embodiment, the second ranging sensor 72 may be disposed forward of a rear wheel of the host vehicle 10 such that the second ranging sensor 72 may be more forward facing.

Figure 4:
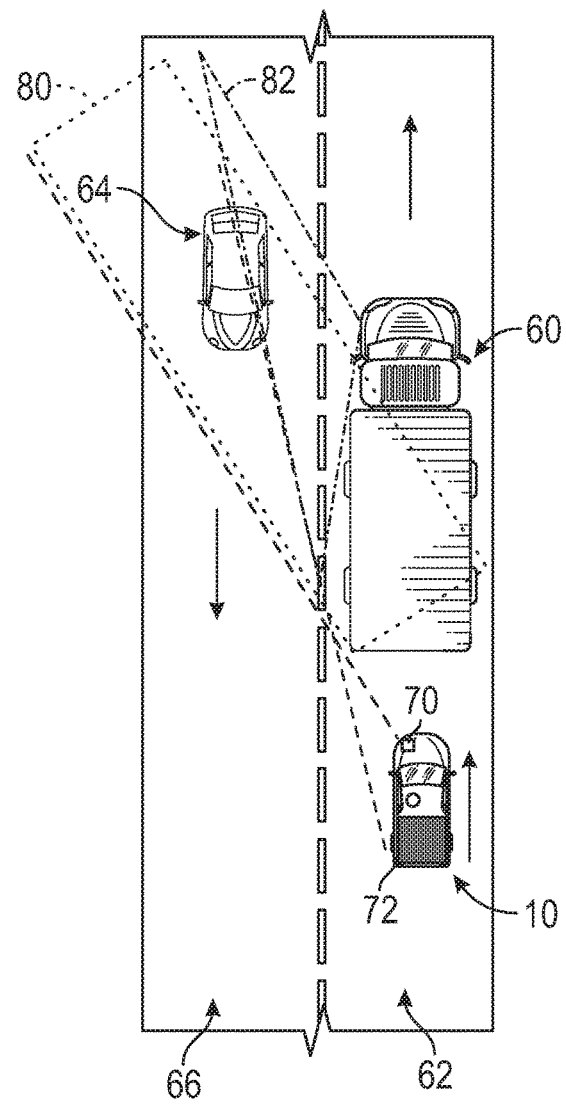
FIG. 4 is an illustration of the host vehicle traveling in a lane detecting the vehicle and the incoming vehicle.

The first ranging sensor 70 and/or the second ranging sensor 72 may be corner radar that are arranged to detect the incoming vehicle 64 present in the adjacent lane 66. As shown in FIG. 4, should the host vehicle 10 be within a threshold distance or a predetermined distance of the forward vehicle 60, an operator of the host vehicle 10 may be unable to view the incoming vehicle 64 in the adjacent lane 66, due to the size of the forward vehicle 60. The disposing of the first ranging sensor 70 and/or the second ranging sensor 72 proximate the corners of the host vehicle 10 disposes the first ranging sensor 70 and/or the second ranging sensor 72 laterally closer to the lane marker of the road to increase the range of vision of the vehicle safety system 14, with the first ranging sensor 70 having a first field-of-view 80 and the second ranging sensor 72 having a second field-of-view 82 that are able to view areas that are otherwise blocked from the view of the operator of the host vehicle 10.

The first field-of-view 80 of the first ranging sensor 70 and the second field-of-view 82 of the second ranging sensor 72 improves detection capabilities of the vehicle safety system 14 as the distance between the host vehicle 10 and the forward vehicle 60 decreases or the host vehicle 10 becomes larger or wider. The first field-of-view 80 of the first ranging sensor 70 and the second field-of-view 82 of the second ranging sensor 72 also improves the detection capabilities of the ranging system 52 during low-light conditions or adverse weather.

The first ranging sensor 70 and/or the second ranging sensor 72 of the ranging system 52 may be a ranging sensor, an optical sensor, an optical camera, an ultrasonic sensor, a thermal sensor, a capacitive sensor, an inductive sensor, a sonar device, an infrared detector, a laser device, a LiDAR device, a RADAR device, a combination of the aforementioned, or a vehicle to vehicle communication system.

The first ranging sensor 70 and/or the second ranging sensor 72 of the ranging system provides data or a signal indicative of the speed or velocity of the object, the forward vehicle 60, or the incoming vehicle 64 or the distance between the object, the forward vehicle 60, or the incoming vehicle 64 and the host vehicle 10 to at least one of the steering system 12, the ADS 40, and the controller 54. The imaging system 50 and the ranging system 52 may work in concert to identify/classify the object, the forward vehicle 60, or the incoming vehicle 64; to determine a distance between the object, the forward vehicle 60, or the incoming vehicle 64 and the host vehicle 10; and a speed or velocity of the object, the forward vehicle 60, or the incoming vehicle 64.

The controller 54 may be provided as a separate and distinct controller from the ADS 40. In at least one embodiment, the ADS 40 and the controller 54 may be integrated as a single controller or control module. The controller 54 is provided with input communication channels that are arranged to receive signals or data from the sensor of the imaging system 50 and first ranging sensor 70 and/or the second ranging sensor 72 of the ranging system 52. The controller 54 is provided with output communication channels that are arranged to provide signals or data to the display interface 16 to notify an operator of the host vehicle 10 as to the time to pass the forward vehicle 60 or a warning indicator should an incoming vehicle 64 be present. The output communication channels are also arranged to provide signals or commands to the steering system 12 to move, pivot, or turn at least one vehicle wheel of the host vehicle 10.

The controller 54 includes at least one processor, microprocessor, or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 54 to provide the signals or commands to the steering system 12 and/or the display interface 16.

Figure 2:
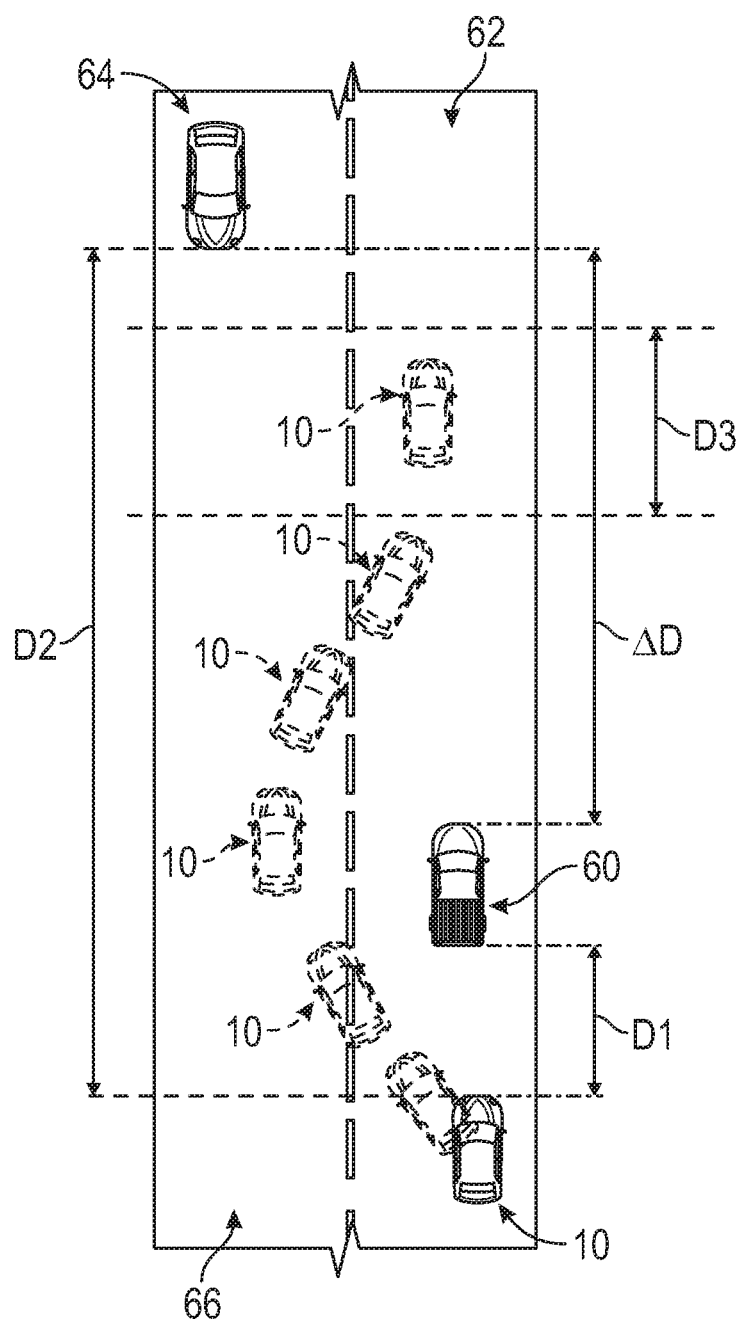
FIG. 2 is an illustration of the host vehicle executing a passing maneuver.

Referring to FIG. 2, an illustration of the host vehicle 10 attempting to overtake and pass the forward vehicle 60 is shown. The controller 54 of the vehicle safety system 14 is programmed to output for display to the operator of the host vehicle 10, via the display interface 16, the time available/time left, T, to overtake and pass a forward vehicle 60 and return to the same lane 62 as well as the speed (velocity), Vel, to overtake and pass the forward vehicle 60 to avoid a potential head-on impact event with the incoming vehicle 64 in the adjacent lane 66 of the host vehicle 10 based on the distance and the speed or velocity of the forward vehicle 60 and the incoming vehicle 64 relative to the host vehicle 10.

The controller 54 of the vehicle safety system 14 may perform a series of estimations or calculations and is programmed to output for display, via the display interface 16, the time available/time left to overtake and pass the forward vehicle 60, and the speed or velocity to overtake and pass the forward vehicle 60 responsive to the indicia of an impending host vehicle maneuver to pass the forward vehicle 60 and return to the same lane 62. The indicia of an impending host vehicle maneuver to pass the forward vehicle 60 may include: a distance between the host vehicle 10 and the forward vehicle 60 becoming less than a threshold distance, a difference in speed or relative velocity between the host vehicle 10 and the forward vehicle 60 being greater than a threshold speed or threshold velocity difference, an increase in speed or velocity of the host vehicle 10 coupled with an overt movement, actuation, or rotation of the operator input device 20 towards a lane marker of the road or towards the adjacent lane 66, an increase in speed or velocity of the host vehicle 10 coupled with an operator of the host vehicle 10 activating a turn signal or other directional indicator towards the lane marker of the road or towards the adjacent lane 66, or an operator of the host vehicle 10 activating a turn signal or other directional indicator towards the lane marker of the road or towards the adjacent lane 66.

The controller 54 of the vehicle safety system 14 is arranged to monitor a first distance, D1, and a first speed (velocity), V1, of the forward vehicle 60 of the host vehicle 10 within the same lane 62 as the host vehicle 10 using at least one of the imaging system 50 and/or the ranging system 52. The first distance, D1, is a relative position or a relative distance between the host vehicle 10 and the forward vehicle 60. The first speed (velocity), V1, may be a relative velocity between the host vehicle 10 and the forward vehicle 60 or the actual speed (velocity) of the forward vehicle 60.

The controller 54 of the vehicle safety system 14 is arranged to monitor a second distance, D2, and a second speed (velocity), V2, of the incoming vehicle 64 in the adjacent lane 66 to the host vehicle 10 using at least one of the imaging system 50 and/or the ranging system 52. The second distance, D2, is a relative position or a relative distance between the host vehicle 10 and the incoming vehicle 64. The second speed (velocity), V2, may be a relative velocity between the host vehicle 10 and the incoming vehicle 64 or the actual velocity of the incoming vehicle 64.

In at least one embodiment, the vehicle safety system 14 is configured to detect and/or identify objects within an external operating environment of the host vehicle 10 such as the shape of the road upon which the host vehicle 10 is traveling using the imaging system 50 and/or a GPS or navigation system. The controller 54 of the vehicle safety system 14 may then determine a time adjustment, Td, which is time subtracted for taking a curved path while overtaking and passing the forward vehicle 60.

The controller 54 of the vehicle safety system 14 is arranged to determine or identify a safe zone or target location disposed between the forward vehicle 60 and the incoming vehicle 64 at a third distance, D3. The third distance, D3, is the distance between the forward vehicle 60 and the incoming vehicle 64 that the host vehicle 10 may fit within after passing the forward vehicle 60 and returning to the same lane 62.

The controller 54 of the vehicle safety system 14 determines a change in distance, ΔD, which is the distance between the forward vehicle 60 and the incoming vehicle 64.

The change in distance, ΔD, is based on the second distance, D2, the first distance, D1, and an estimated length of the forward vehicle, LVF.

The controller 54 of the vehicle safety system 14 estimates the time left, T, to pass the forward vehicle 60 using the following relationship:

Time Left To Pass $(T)=(\Delta D-D3)/(V1+V2)-Td$ [Relationship 1]

The controller 54 of the vehicle safety system 14 estimates the distance, S, that the host vehicle 10 needs to overtake and pass the forward vehicle 60 using the following relationship:

Distance To Pass $(S)=D3/2+V1*T+LVF+D1$ [Relationship 2]

The controller 54 of the vehicle safety system 14 then estimates an acceleration of the host vehicle 10 to achieve the velocity, Vel, to pass using the following relationship:

Acceleration $(a)=(2/T^2)*(D3/2+V1*T+LVF+D1-V0*T)$ [Relationship 3]

Where V0 is the current velocity of the host vehicle 10.

The controller 54 of the vehicle safety system 14 then determines the velocity needed to pass the forward vehicle 60 using the following relationship:

Velocity to Pass $(Vel)=V0+a*T$ [Relationship 4]

The above relationships assume a constant acceleration of the host vehicle 10, however it is understood that the acceleration of the host vehicle 10 may vary over time, as will the velocities of the host vehicle 10 and the other vehicles (e.g. the forward vehicle 60 and the incoming vehicle 64). Therefore, these relationships may be adjusted or derived to account for varying acceleration or varying speeds/velocities of the host vehicle 10 and/or the other vehicles.

Figure 3:
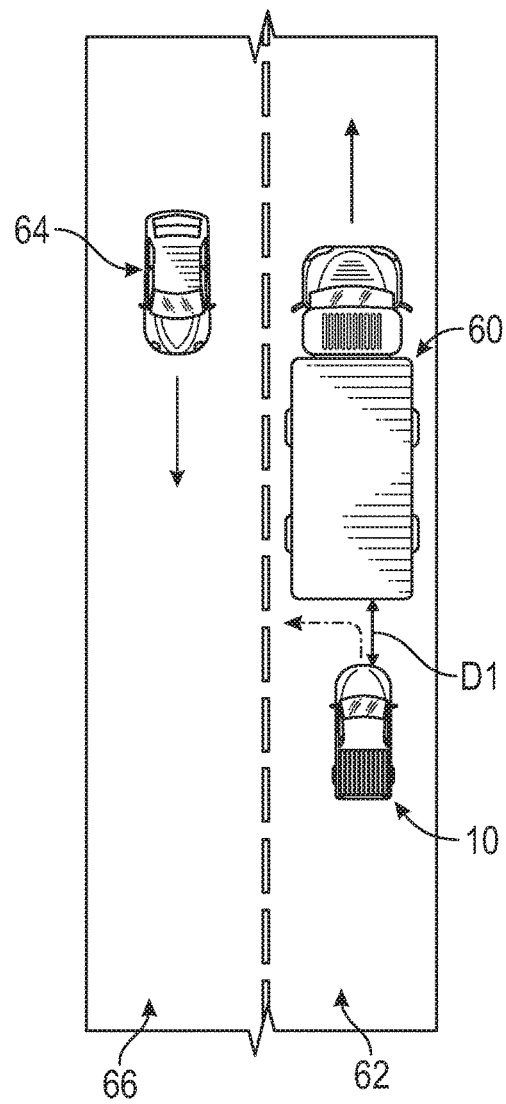
FIG. 3 is an illustration of a host vehicle traveling proximate a vehicle in a lane and an incoming vehicle in an adjacent lane.

Referring to FIG. 3, while the host vehicle 10 is motion and the first distance, D1, is less than a threshold distance or predetermined distance from the forward vehicle 60 and within the same lane 62 as the host vehicle 10, as detected by at least one of the imaging system 50 and the ranging system 52 of the vehicle safety system, and at least one of the imaging system 50 and the raging system 52 does not reliably detect the incoming vehicle 64 and the adjacent lane 66, the controller 54 of the vehicle safety system 14 may inhibit the host vehicle 10 from performing a lane change maneuver to overtake and pass the forward vehicle 60. The controller 54 may operate the steering actuator 24 of the steering system 12 to resist rotation or movement of the operator input device 20 to oppose a lane change maneuver to overtake and pass of the forward vehicle 60. The threshold distance or the predetermined distance may be based on the road curvature, the size of the forward vehicle 60, relative or absolute speeds (velocities) of the host vehicle 10, the forward vehicle 60, and/or the incoming vehicle 64, and a position of the host vehicle 10 relative to the forward vehicle 60.

The input provided by the steering actuator 24 may be a rotational input, feedback (e.g. haptic feedback or the like), vibratory input, or the like that may be applied to at least one of the operator input device 20 and/or the steering shaft 22. The input provided by the steering actuator 24 may resist or oppose actuation or rotation of the operator input device 20 and/or the steering shaft 22.

The input provided by the steering actuator 24 may be a torque overlay that provides a steering buzz (haptic feedback) or cause a lane change intervention opposing actuation or rotation of the operator input device 20. The steering buzz may be a high frequency (greater than 20 Hz) sinusoidal torque overlay added to the steering assist that may be provided by the steering actuator. This action may not lead to a path change of the host vehicle 10, but alerts the driver of the host vehicle 10 of the imaging system 50 and/or the ranging system 52 being unable to determine if an incoming vehicle 64 is present within the adjacent lane 66. The controller 54 may substantially simultaneously output for display a warning indicator.

The input provided by the steering actuator 24 may be bidirectional and may be reduced or rollback gradually as the distance (e.g. the first distance, D1) between the forward vehicle 60 and the host vehicle 10 increases to above a predetermined distance, or becomes within a calibrateable range. The bidirectional resistance enables the vehicle safety system 14 to impede rotation of the operator input device 20 and the steering shaft 22 in either direction if the distance between the host vehicle 10 and the forward vehicle 60 is less than a predetermined distance.

During right turn scenarios (e.g. right hand lane changes, passing from the right and a multilane highway, using the right shoulder to pass or to stop), the bidirectional resistance provided by the steering actuator 24 may impede the performance of the right turn by the operator of the host vehicle 10 until a distance between the host vehicle 10 and the forward vehicle 60 is greater than a threshold distance or a predetermined distance. During left turn scenarios (e.g. left-hand lane changes, left turns across lanes), the bidirectional resistance may impede the performance of the left turn by the operator of the host vehicle 10 until a distance between the host vehicle 10 and the forward vehicle 60 is greater than a threshold distance or a predetermined distance.

Referring to FIG. 5, the host vehicle 10, the forward vehicle 60, and the incoming vehicle 64 may be in communication with each other through the vehicle to vehicle communication system, using a vehicle to vehicle communication protocol. The vehicle to vehicle communication system may function as or be at least one of the imaging system 50 and/or the ranging system 52 or may be provided along with the at least one of the imaging system 50 and/or the ranging system 52. The vehicle to vehicle protocol may inform the driver of the forward vehicle 60 and the driver of the host vehicle 10 as to the presence of the incoming vehicle 64. The forward vehicle 60 may provide information (e.g. position, velocity, or distance, of the incoming vehicle 64) to the host vehicle 10 to alert the driver of the host vehicle 10 of the incoming vehicle 64, via the display interface 16.

In at least one embodiment, the incoming vehicle 64 may provide similar information (e.g. position, velocity, or distance, of the incoming vehicle 64) directly to the host vehicle 10 and the forward vehicle 60 through the vehicle to vehicle communication system. Should one of the vehicles not be part of the vehicle to vehicle communication system, the host vehicle 10 may attempt to connect via a vehicle to infrastructure communication system. Should the vehicle to infrastructure system not be present, a cellular network may be used to provide information about the incoming vehicle 64 to at least one of the host vehicle 10 and the forward vehicle 60.

The steering actuator 24 of the steering system 12 or another actuation device may not be operated to provide an input to at least one of the steering shaft 22 and the operator input device 20, while the host vehicle 10 is proximate or within a threshold distance or a predetermined distance of a vehicle that is stopped, braking, or decelerating in front of the host vehicle 10 and within the same lane as the host vehicle 10, as detected by at least one of the imaging system 50 and the ranging system 52 of the vehicle safety system 14. The operator of the host vehicle 10 may provide an input via the operator input device 20 to avoid the vehicle.

The imaging system 50 of the vehicle safety system 14 may be arranged to read the road signs and lane markings of the road upon which the host vehicle 10 is traveling. The imaging system 50 may read the road signs and the lane markings prior to the host vehicle 10 performing a pass of the forward vehicle 60. The information concerning the road signs or lane markings may be fused by the controller 54 with information provided by the ranging system 52 of the vehicle safety system 14 to increase the confidence of the vehicle safety system 14 about the driving scenario and allow for more decisive steering action to take place.

The input provided by the steering actuator 24 to the steering shaft 22 and/or the operator input device 20 provides a greater resistance to oppose actuation or rotation of the operator input device 20, based on information provided by the imaging system 50 indicative of the road signs or lane markings and a detected incoming vehicle 64. The input provided by the steering actuator 24 to the steering shaft 22 and/or the operator input device 20 may provide a reduced resistance or may not oppose the actuation or rotation of the operator input device 20 to change lanes, based on information provided by the imaging system 50 indicative of the road signs or lane markings, without the ranging system 52 detecting an incoming vehicle 64. The input provided by the steering actuator 24 to the steering shaft 22 and/or the operator input device 20 may gently nudge or rotate the operator input device 20 back towards the center of the same lane 62, based on information provided by the imaging system 50 and/or the ranging system 52 indicative of a non-preferred lane change.

Referring to FIG. 6, responsive to the host vehicle 10 executing a passing maneuver in which the host vehicle 10 moves between the same lane 62 and the adjacent lane 66 to pass the forward vehicle 60, and at least one of the imaging system 50 and/or the ranging system 52 of the vehicle safety system 14 detects an incoming vehicle 64 within the safe zone or target location forward of the forward vehicle 60 (e.g. D3), the controller 54 or the ADS 40 operates the steering actuator 24 of the steering system 12 to perform a lane change intervention. The lane change intervention uses the steering actuator 24 to operate the steering system 12 to move the host vehicle 10 back to the original lane (e.g. same lane 62) or abort the passing maneuver. The controller 54 may compare an estimation of both time to pass the forward vehicle 60 and a time to impact between the host vehicle 10 and incoming vehicle 64 to make a decision if the steering actuator 24 should be operated to return the host vehicle 10 to the original lane.

The lane change intervention may be a torque overlay applied in the opposite direction of the steering assist provided by the steering actuator 24. The maximum magnitude of the torque overlay may be based on various factors such as obstacle detection confidence, rate of change of lane deviation, velocity and/or position of the incoming vehicle 64, or velocity and/or position of the forward vehicle 60.

Figure 7:
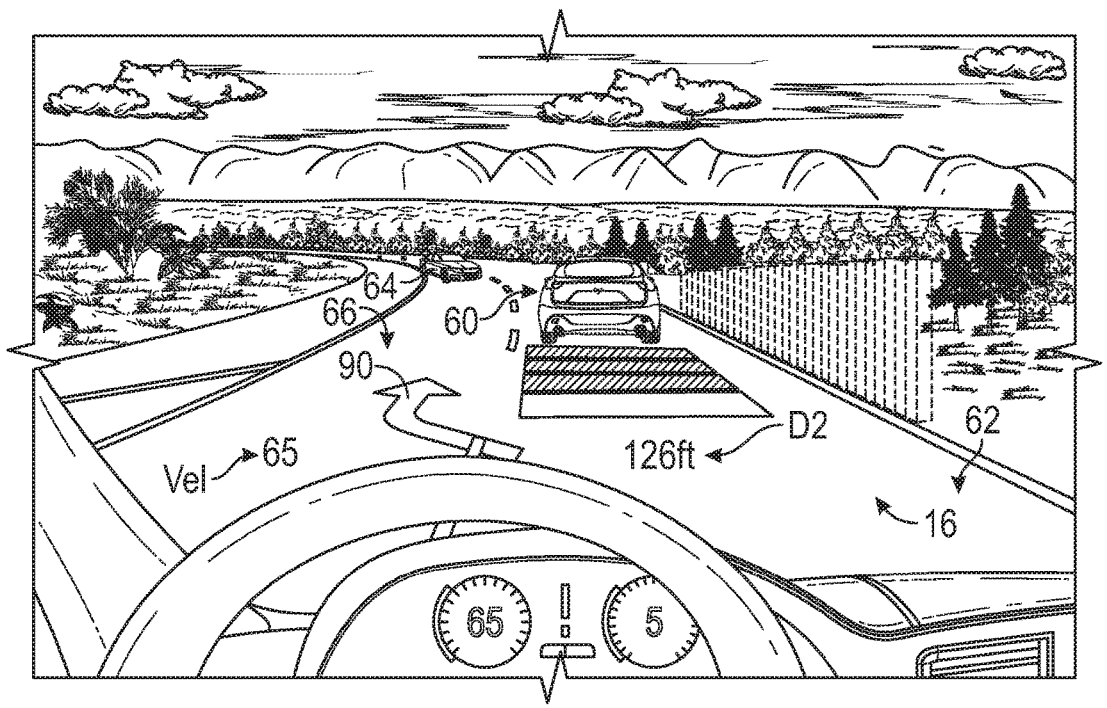
FIG. 7 is an illustration of a display interface of the host vehicle.
Figure 8A:
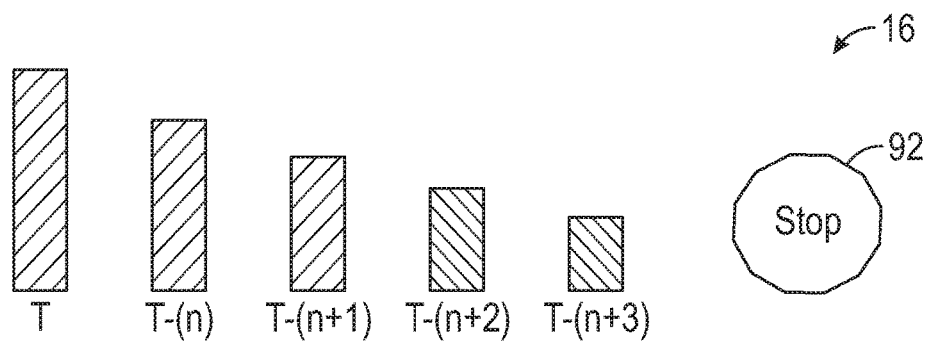
FIGS. 8A and 8B are illustrations of a time left the past display.
Figure 8B:
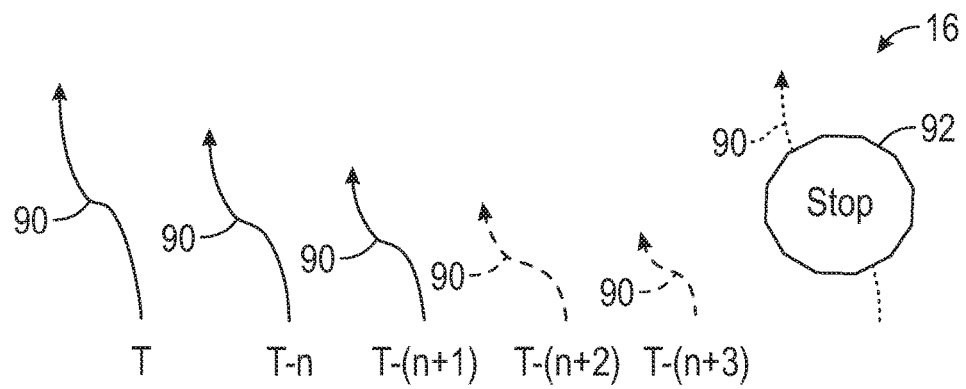

Referring to FIGS. 7, 8A, and 8B, the display interface 16 may be a human machine interface, such as a heads up display, an infotainment screen, or other form of interface that is arranged to display information to the operator of the host vehicle 10. Information that may be displayed via the display interface 16 may include: the time left to pass, T; the speed (velocity) to pass, Vel; a predicted passing route 90; the relative distance, D1, between the host vehicle 10 and the forward vehicle 60; the relative distance, D2, between the host vehicle 10 and the incoming vehicle 64; and/or the distance, ΔD, between the front of the forward vehicle 60 and the front of the incoming vehicle 64.

The controller 54 is programmed to output for display, the time left to pass, T, via the display interface 16 in a variety of ways. The time left to pass may be displayed as a numerical countdown accompanied with a shortening bar, as shown in FIG. 8A. The time left to pass may be displayed as a numerical countdown accompanied with an arrow end indicative of a predicted passing route 90, as shown in FIG. 8B. The display interface 16 may provide an auditory output announcing the time left to pass the forward vehicle 60. Additional ways of displaying the time left to pass are also contemplated.

The display interface 16 may not display the time left to pass when the incoming vehicle 64 is not detected by at least one of the imaging system 50 and/or the ranging system 52. The controller 54 is programmed to output for display, via the display interface 16, a warning 92 indicative of an unsafe condition for passing the forward vehicle 60. The warning 92 may be a visual indicator, an auditory indicator, or haptic feedback, responsive to the incoming vehicle 64 being within or proximate the target location.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A vehicle safety system, comprising:
a controller in communication with at least one of an imaging system and a ranging system, at least one of the imaging system and the ranging system being arranged to monitor a distance and speed of a forward vehicle and an incoming vehicle relative to a host vehicle, the controller being programmed to:
output for display a time left to pass the forward vehicle based on the distance and the speed of the forward vehicle and the incoming vehicle, responsive to indicia of an impending host vehicle maneuver to pass the forward vehicle, wherein the indicia of an impending host vehicle maneuver to pass the forward vehicle includes:
a distance between the host vehicle and the forward vehicle becoming less than a threshold distance; and
a difference in relative velocity between the host vehicle and the forward vehicle being greater than a threshold velocity difference; and
selectively adjust the time left to pass responsive to identifying at least one object within an external operating environment of the host vehicle.

2. The vehicle safety system of claim 1, wherein the time left to pass the forward vehicle is output for display via a display interface.

3. The vehicle safety system of claim 2, wherein the controller is programmed to output for display a predicted passing route.

4. The vehicle safety system of claim 1, wherein the forward vehicle is operating in a same lane of travel as the host vehicle.

5. The vehicle safety system of claim 4, wherein the incoming vehicle is operating in an adjacent lane of travel.

6. The vehicle safety system of claim 5, wherein the controller is in communication with a steering system having a steering actuator that is operatively connected to an operator input device.

7. The vehicle safety system of claim 6, wherein the controller is programmed to operate the steering actuator to provide an input opposing rotation of the operator input device, responsive to the host vehicle being within a predetermined distance from the forward vehicle.

8. The vehicle safety system of claim 6, wherein the controller is programmed to operate the steering system to return the host vehicle to the same lane, responsive to the host vehicle moving from same lane to the adjacent lane and at least one of the imaging system and the ranging system detecting the incoming vehicle within a target location forward of the forward vehicle.

9. A vehicle safety system, comprising:
a ranging system arranged to provide a signal indicative of at least one of:
a first speed of a forward vehicle and a second speed of an incoming vehicle, and
a first distance between the forward vehicle and a host vehicle and a second distance between the incoming vehicle and the host vehicle; and
a controller in communication with the ranging system, the controller being programmed to:
output for display, a time left to pass the forward vehicle based on the signal and responsive to indicia of an impending host vehicle maneuver to pass the forward vehicle, wherein the indicia of an impending host vehicle maneuver to pass the forward vehicle includes:
a distance between the host vehicle and the forward vehicle becoming less than a threshold distance; and
a difference in relative velocity between the host vehicle and the forward vehicle being greater than a threshold velocity difference; and
selectively adjust the time left to pass responsive to identifying at least one object within an external operating environment of the host vehicle.

10. The vehicle safety system of claim 9, wherein the ranging system includes a ranging sensor disposed proximate a front corner of the host vehicle.

11. The vehicle safety system of claim 9, wherein the ranging system is a vehicle to vehicle communication system.

12. The vehicle safety system of claim 9, wherein the controller is programmed to identify a target location disposed between the forward vehicle and the incoming vehicle.

13. The vehicle safety system of claim 12, wherein the controller is programmed to output for display a warning, responsive to the incoming vehicle being proximate the target location.

14. The vehicle safety system of claim 12, wherein the controller is programmed to determine a change in distance between the forward vehicle and the incoming vehicle based on the second distance, the first distance, and an estimated length of the forward vehicle.

15. The vehicle safety system of claim 14, wherein the time left to pass the forward vehicle is further based on the change in distance.

16. The vehicle safety system of claim 14, wherein the controller is programmed to output for display a velocity to pass the forward vehicle based on at least one of the signal, the target location, the change in distance, a velocity of the host vehicle, the time to pass, and the time left to pass the forward vehicle.

17. The vehicle safety system of claim 9, wherein the controller is in communication with a steering actuator of a steering system.

18. The vehicle safety system of claim 17, wherein the controller is programmed to operate the steering actuator to provide feedback to an operator input device responsive to the first distance being less than a predetermined distance.

* * * * *